No. 721,807. PATENTED MAR. 3, 1903.
T. B. JEFFERY & R. SYMMONDS, Jr.
POWER TRANSMITTING DEVICE.
APPLICATION FILED MAY 24, 1901.
NO MODEL. 2 SHEETS—SHEET 1.
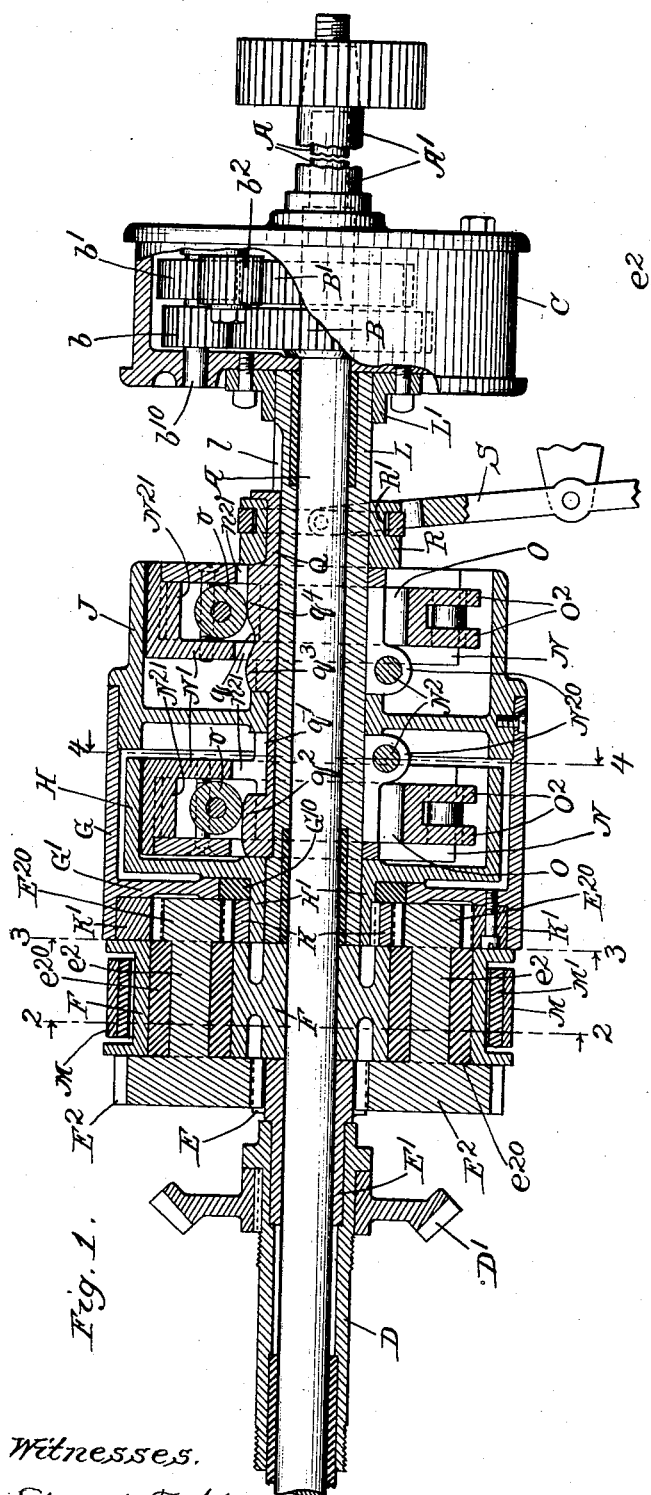
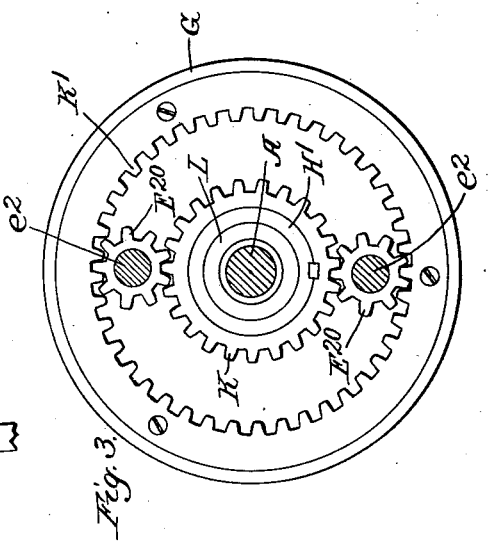
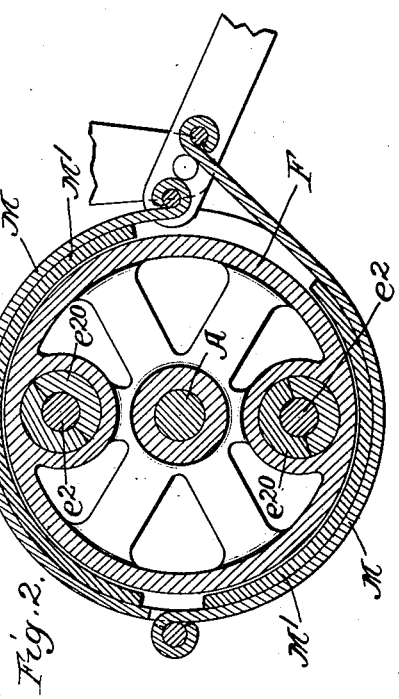
Witnesses.
Edward T. Wray
Edgar L. Conant
Inventor's.
Thomas B. Jeffery.
Robert Symmonds Jr.
by Burton & Burton
their Atty's.

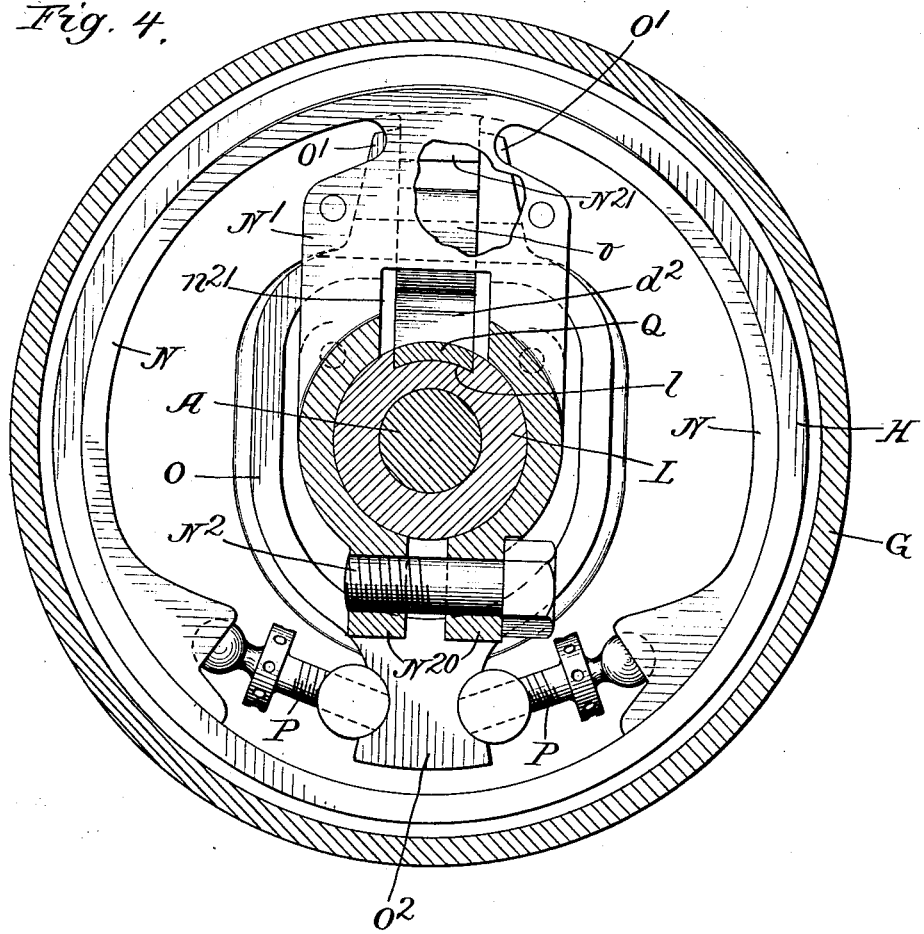

UNITED STATES PATENT OFFICE.

THOMAS B. JEFFERY AND ROBERT SYMMONDS, JR., OF KENOSHA, WISCONSIN; SAID SYMMONDS ASSIGNOR TO SAID JEFFERY.

POWER-TRANSMITTING DEVICE.

SPECIFICATION forming part of Letters Patent No. 721,807, dated March 3, 1903.

Application filed May 24, 1901. Serial No. 61,727. (No model.)

*To all whom it may concern:*

Be it known that we, THOMAS B. JEFFERY and ROBERT SYMMONDS, Jr., citizens of the United States, and residents of Kenosha, in the county of Kenosha and State of Wisconsin, have invented certain new and useful Improvements in Power-Transmitting Devices, of which the following is a specification, reference being had to the accompanying drawings, forming a part thereof.

This invention is designed to provide new and improved means for transmitting driving power to a shaft or wheels thereon, with capacity for varying the speed at which the shaft or wheels shall be driven under continuous speed of the initial driving-wheel and for reversing the direction of movement of the driven shaft or wheels particularly adapted for such reversing at a very low speed.

It consists in the features of construction which are set out in the claims.

In the drawings, Figure 1 is an axial section of the entire device. Fig. 2 is a section at the line 2 2 on Fig. 1. Fig. 3 is a section at the line 3 3 on Fig. 1. Fig. 4 is a section at the line 4 4 on Fig. 1.

This invention is herein shown in a form adapting it for use in a motor-vehicle, in which the carrying-wheels at the opposite ends of the driving-shaft are connected by a differential or compensating gear for the well-understood purpose of such connection in such vehicles, and in certain details the invention is shown in a form specially adapted for this use, to which, however, it is not confined.

The axle is in two sections A and A', telescoped together and connected, respectively, to the gears B and B' of the compensating-gear train, which comprises, in addition to said gears, the pinions $b$ and $b'$, rigid with the same shaft and intermeshing, respectively, with the gears B, and a pinion $b^2$, which meshes with the gear B', their said shaft $b^{10}$ and that of the pinion $b^2$ being journaled in the compensating-gear case C, through which driving movement is transmitted from the mechanism hereinafter described by way of the compensating-gear train to the two elements A A' of the axle, which may have fixed to them pinions driving the carrying-wheels, respectively, of the vehicle. (Not represented in the drawings.) The action of the compensating-gear train in the case is familiar and need not be described.

D is a sleeve journaled on the axle A and having rigid with it the wheel D', to which driving movement is communicated from any source of power.

E is a pinion loose on the axle A, having a long sleeve-hub E' extending within the sleeve D and constituting the means by which the pinion is made rigid with the sleeve, and thereby with the driving-wheel D'.

$E^2$ $E^2$ are two similar gears having integral with them, respectively, pinions $E^{20}$ $E^{20}$, the shafts $e^2$ $e^2$, which connect the gears with the pinions, being journaled in a gear-carrier, which is in the form of a band wheel or pulley F, said gear-carrier being loose on the axle A. For convenience of construction the gear-carrier is apertured at diametrically opposite points to permit the pinions $E^{20}$ $E^{20}$ to pass through it, two-part boxes $e^{20}$ $e^{20}$, large enough to occupy the apertures and arranged to be secured therein, being provided for the axles $e^2$ $e^2$, respectively.

L is a sleeve or hollow shaft on the axle A, extending from the side of the pinion-carrier F opposite the pinion E to the case C of the compensating or differential gear train and rigidly joined to said case by the flanged collar L'.

H and J are two clutch-drums mounted loose on the hollow shaft L. The clutch-drum H has a hub H', to which is rigidly secured a pinion K, and to the clutch J there is rigidly connected a cup-shaped coupling-reach G, to the back or outer side of whose bottom or diaphragm G' there is rigidly secured an internal gear-ring K', concentric with the axle A and in the same transverse plane with the pinion K. This coupling-reach encompasses the clutch-drum H, having at the center of its bottom or diaphragm a suitable bearing $G^{10}$, at which it is journaled on the hub of said clutch-drum H, its cylindrical wall being rigidly joined beyond the clutch-drum H to a clutch-drum J, so that it operates as a means of spanning or reaching past the clutch-drum H to the clutch-drum J, coupling the latter with the gear-ring K', from which circumstance we derive the name "coupling-reach" applied to it. The pinions $E^{20}$ $E^{20}$ intervene between the pinion K and the internal gear-ring K', intermeshing with both.

M is a steel brake-strap having a leather face M' and extending around the periphery of the pulley-shaped pinion-carrier F and provided with any suitable means for tightening it and slacking it on its seat about the latter.

It will be understood from the foregoing description that when the brake M is tightened, so as to hold the pinion-carrier F non-rotating, the rotation of the wheel D', carrying the pinion E, will communicate rotary motion through the gears $E^2$ and pinions $E^{20}$ to both the pinion K and the internal gear-ring K' and will rotate, but in opposite directions, both the clutch-drums H and J. For the purpose of clutching these drums, one or both at a time at will of the operator, to the hollow shaft L, and thereby causing them to drive the axle A A' in one direction or the other through the medium of the differential-gear train, which comprises the case C, we provide a form of clutch mechanism, which comprises within each of the clutch-drums an expansible clutch-shoe N, which may be of cast-iron, but even when of such material will be sufficiently elastic to be spread to force it into frictional engagement with the interior surface of the drum, within which it fits loosely when not thus expanded. This shoe has a frog N' extending inward from a point opposite the opening between the ends adapted to be spread, as described, such frog being adapted to be clamped on the hollow shaft L by the bolt $N^2$ through the lugs $N^{20}$ $N^{20}$, which terminate the frog. For the purpose of expanding the shoe into frictional engagement with the drum, so that it will transmit the motion of the drum to the shaft, there is provided within the shoe a yoke O, which spans the hollow shaft L and the central portion of the frog, terminating opposite the opening of the shoe in the parallel-faced ears O' O', which clasp a parallel-faced boss $N^{21}$ at the root of the frog, whereby the yoke is guided in a short sliding movement transverse to the shaft. At the opposite side of the shaft are provided two toggles P P, ball-jointed at one end to the head $O^2$ of the yoke O and at the other end to the opposite ends of the shoe, and between the two ears O' O' there is located, journaled in said lugs, a roller o, which is exposed toward the hollow shaft.

Q is a sliding cam lodged and adapted to slide in a channel l in the shaft L, projecting in an opening $n^{21}$ in the frog N' diametrically inward from the boss $N^{21}$. Said cam therefore extends between the rollers o in the two clutches and the shaft L, and it has tracks facing the rollers of form shown in Fig. 1, having depressions at q and q' and elevations $q^2$, $q^3$, and $q^4$, so arranged that when the cam stands at one limit of its adjustment, as in Fig. 1, the rollers of both clutches are held outward from the center of the shaft, causing both shoes to be expanded and both clutches to be in driving engagement with the shaft, and when the cam is partly withdrawn from that position the roller of the clutch H is still held outward, keeping that clutch engaged. The roller pertaining to the other clutch passing into the recess q permits the shoe of that clutch to contract and withdraw from frictional engagement with the clutch-drum. The movement of the cam a little farther outward in the opposite direction permits the rollers o of the clutch H to pass off the crest of the elevation $q^2$ and approach the shaft, while the roller of the other clutch passes up onto the elevation $q^3$, causing the shoe of the clutch H to be disengaged and that of the clutch J to be engaged.

R is a collar on the sleeve L outside the clutch-drum J, said collar being engaged with the slide Q and having a peripheral annular channel R', in which a forked shipping-lever S may be engaged to shift the slide Q in one direction or the other, and thereby at the will of the operator cause one clutch or the other to be operatively connected with the shaft L, and thereby to be the medium by which the latter and the differential-gear train and axle are driven.

If the brake M is relaxed, so that the pulley-shaped pinion-carrier F is left free to rotate upon the shaft A and at the same time both clutches H and J are locked by movement of the slide Q to the position shown in Fig. 1, the wheel D' will be connected by the entire train, comprising the pinion-carrier, the pinions thereon, and the two clutches all together operating as a single rigid coupling to the shaft L, which will thus transmit to the differential-gear case C the full speed of the gear-wheel D'. If while the gear-carrier is locked and held non-rotating by the brake-strap the clutch H is locked and the clutch J left unlocked, the pinions $E^{20}$, whose speed is much reduced from that of the wheel D', will transmit still further reduced speed through the pinion K to the clutch H and thence through the shaft L to the differential-gear case, which will be rotated and rotate the axle in the same direction as the gear D'. If while the pinion-carrier is locked by the brake-strap the clutch H is unlocked and the clutch J is locked, the pinions $E^{20}$ will communicate very greatly reduced speed through the internal gear-ring K' to the clutch J and thence through the shaft L to the differential-gear case C, which will thereby be rotated and rotate the axle in the reverse direction from the wheel D'. The three positions at which the shipping-lever S may be set by the operator correspond, therefore, (a) to the maximum speed in a direction which may be considered forward; (b) to reduced speed in the same direction, and (c) to the minimum speed in the reverse direction.

The structure of the clutches H and J is calculated to cause the centrifugal force of the parts which are free to move centrifugally as the shaft revolves to operate in opposition to the shoe-spreading movement of such parts and to oppose even any tendency of the shoe itself to become spread by centrifugal force as it revolves. It is for this reason that the toggles are arranged diverging outwardly from a line connecting the ends seated in the divided ring which forms the shoe, so that their own centrifugal force tends to draw their remote ends inward instead of forcing them outward, which would spread the shoe. For like reason the yoke in which the toggles are pivoted and which serves as the means for operating the toggles to spread the shoe is made with its principal weight at the side of the shaft toward the toggles, so that its own centrifugal force in revolution tends in the direction to withdraw the toggles and not to spread the shoe. I do not limit myself to the particular arrangement shown for this specific purpose, because it would manifestly be possible to obtain the same result even though the toggles were reversed in inclination and the parts performing the function of the yoke were arranged to be moved in the opposite direction to perform that function; but the arrangement shown is considered the most desirable for the specific purpose stated.

We claim—

1. A mechanism for transmitting motion, comprising a shaft to be driven; the loose elements of two clutches on the shaft, and means for engaging them at will with the latter; an external gear rigid with one of said clutch elements at the side opposite the other element; an internal gear encompassing the external gear, and a coupling-reach extending from the second clutch past the first, to the external gear, connecting the latter rigidly with the second clutch; and a gear-wheel meshing with both the internal and external gears, and means for rotating said gear-wheels.

2. A mechanism for transmitting motion, comprising a shaft to be driven; the loose elements of two clutches on the shaft, the driving elements of such clutches rotating with the shaft, adapted to be frictionally engaged with said loose elements respectively; a cam sliding on the shaft, having irregularities operating on the driving element, and adapted at one position of the cam to hold both clutches engaged, in another position to hold only one clutch engaged, and in a third position to hold only the other clutch engaged; means for rotating the loose elements and means for sliding the cam at will to each of said positions.

3. A mechanism for transmitting motion, comprising a shaft to be driven; the loose elements of two clutches on the shaft; an internal gear rigid with the loose element of one clutch, an external gear rigid with the loose element of the other clutch, the gear-wheel meshing with both the internal and the external gears; a rotatable gear-carrier journaled concentrically with the shaft and having the last-mentioned gear journaled on it; means for rotating said gear, and means for releasably locking the gear-carrier against rotation.

4. A mechanism for transmitting motion, comprising a shaft to be driven; the loose elements of two clutches on the shaft; an internal gear rigid with the loose element of one clutch, an external gear rigid with the loose element of the other clutch, a gear-wheel element of the other clutch, a gear-wheel meshing with both the internal and the external gears; a rotatable gear-carrier journaled concentrically with the shaft and having the last-mentioned gear journaled on it; means for rotating said gear, and a friction-brake for restraining the rotation of the gear-carrier.

5. A mechanism for transmitting motion, comprising a shaft to be driven; the loose elements of two clutches thereon; an internal gear rigid with the loose element of one clutch; an external gear rigid with the loose element of the other clutch; a rotatable gear-carrier journaled concentrically with the shaft; a gear journaled on said carrier and meshing with both the internal and the external gears pertaining to the clutch elements respectively; a gear concentric with the shaft and means by which it communicates motion to the gear journaled on the carrier, means for rotating the gear which is concentric with the shaft; and means for releasably locking the gear-carrier against rotation.

6. A mechanism for transmitting motion, comprising a shaft to be driven; the loose elements of two clutches thereon; an internal gear rigid with the loose element of one clutch; an external gear rigid with the loose element of the other clutch; a rotatable gear-carrier journaled concentrically with the shaft; two connected gears journaled on the carrier, one meshing with the internal and external gears of the loose clutch elements respectively; a gear concentric with the shaft meshing with and driving the other of said connected gears; means for driving the gear which is concentric with the shaft, means for releasably locking the gear-carrier against rotation, and means for at will engaging said loose clutch elements with and disengaging them from the shaft.

7. A mechanism for transmitting motion, comprising a main or central axle; a hollow shaft thereon; means for transmitting motion between the axle and the shaft; the loose elements of two clutches on the shaft; an internal gear rigid with the loose element of one clutch; an external gear rigid with the loose element of the other clutch; a gear-carrier journaled about the axle; a gear-wheel journaled on the carrier and meshing with both the internal gear and the external gear of the clutch elements respectively; a gear-wheel journaled on the axle and driving the gear-wheel which is journaled on the carrier; means for releasably locking the carrier against rotation; and means for at will engaging the loose clutch elements with the shaft and disengaging them therefrom.

8. A mechanism for transmitting motion, comprising a main or central axle; a hollow shaft thereon; a differential-gear train transmitting motion between the axle and the hollow shaft; the loose elements of two clutches on the shaft; an internal gear rigid with the loose elements of one clutch, and an external gear rigid with the loose elements of the other clutch; a gear-carrier journaled about the axle; a gear-wheel journaled on the carrier and meshing with the internal gear and the external gear of the loose clutch elements respectively; a gear on the axle and means for driving it, and means by which it drives the gear-wheel journaled on the carrier; means for releasably locking the carrier against rotation; and means for at will engaging the loose clutch elements with the shaft and disengaging them therefrom.

9. A mechanism for transmitting motion, comprising a shaft to be driven; the loose elements of two clutches thereon, each having a cylindrical flange concentric with the shaft; a shoe fitting loosely within the flange in the form of a ring open at one side and having extending from the opposite side toward the center a frog for securing it to the shaft; means for spreading the ends of the shoe to expand it into frictional engagement with the flange; a slide on the shaft for operating such spreading means in both clutches, arranged at one position in its range of sliding movement to hold both shoes spread in engagement with the flanges respectively, at another position to hold one shoe engaged and the other disengaged, and at a third position to hold the first shoe disengaged and the second shoe engaged; and means for rotating the two loose elements of the clutches in opposite directions.

10. A mechanism for transmitting motion, comprising a shaft to be driven; the loose elements of two clutches on the shaft, each having a cylindrical flange concentric therewith, and a shoe fitting loosely within the flange in the form of a ring open at one side and having extending from the other side toward the center a frog for securing it to the shaft; toggle connections between the ends of the ring, and a device moving transversely with respect to the shaft for operating the toggles to spread the ring having an excess of weight at the side of the shaft-axis away from which the device moves in so spreading the ring; a slide on the shaft arranged to operate the toggle-spreading devices of both clutches, and provided with irregularities for that purpose; whereby at one position in the range of the sliding movement it holds the toggles of both clutches spread and the shoes engaged with the flanges, at another position it holds the toggles of only one clutch spread, and at a third position it holds the toggles of only the other clutch spread; an internal gear rigid with the loose element of one clutch, and an external gear rigid with the loose element of the other clutch; a gear-wheel meshing with both the internal and external gears, and means for rotating said gear-wheel.

11. A mechanism for transmitting motion, comprising a shaft to be driven; the loose elements of two clutches thereon, each having a cylindrical flange concentric with the shaft; a shoe fitting loosely within the flange in the form of a ring open at one side and having extending from the opposite side toward the center a frog for securing it to the shaft; means for spreading the ends of the shoe to expand it into frictional engagement with the flange; a slide on the shaft for operating such spreading means in both clutches, arranged at one position in the range of its sliding movement to hold both shoes spread, at another position to hold the shoe of only one clutch spread, and at the other position to hold the shoe of only the other clutch spread; an internal gear rigid with the loose element of one clutch, and an external gear rigid with the loose element of the other clutch; a gear-wheel meshing with both the internal and the external gears, and means for rotating said gear-wheel.

12. A mechanism for transmitting motion, comprising a shaft to be driven; the loose elements of two clutches thereon, having each a cylindrical flange concentric with the shaft, and a shoe fitting loosely within the flange in the form of a ring open at one side and having extending from the other side toward the center a frog for securing it to the shaft; means moving transversely with respect to the shaft for spreading the ends of the ring-shoe to force it into frictional engagement with the flange, said transversely-moving means having an excess of weight at the side of the shaft-axis away from which it moves to spread the ring; whereby the centrifugal force of said transversely-moving means tends to oppose its ring-spreading movement; an internal gear rigid with the loose element of one clutch, and an external gear rigid with the loose element of the other clutch; a gear-wheel meshing with both the internal and external gears, and means for rotating said gear-wheel; and a slide on the shaft operating the transversely-moving ring-spreading means in both clutches, arranged at one position in the range of its sliding movement to hold both said rings spread, at another position to hold only one ring spread, and at a third position to hold only the other ring spread.

13. A mechanism for transmitting motion, comprising a shaft to be driven; the loose elements of two clutches thereon; an internal gear rigid with the loose element of one clutch; an external gear rigid with the loose element of the other clutch; a gear-wheel meshing with both the internal and the external gears; means for rotating said gear-wheel; the driving elements of such clutches rotating with the shaft, adapted to be frictionally engaged with said loose elements respectively; a cam sliding on the shaft having irregularities operating on the driving element, and adapted at one position of the cam to hold both clutches engaged, in another position to hold only one clutch engaged, and in a third position to hold only the other clutch engaged; means for rotating the loose elements and means for sliding the cam at will to each of said positions.

In testimony whereof we have hereunto set our hands, at Kenosha, Wisconsin, in the presence of two witnesses, this 20th day of May, A. D. 1901.

THOS. B. JEFFERY.
ROBERT SYMMONDS, JR.

In presence of—
  CHARLES JEFFERY,
  L. B. SAWINSKY.